(12) United States Patent
Joze et al.

(10) Patent No.: US 12,536,249 B2
(45) Date of Patent: Jan. 27, 2026

(54) NEURAL NETWORK TARGET FEATURE DETECTION

(71) Applicant: Microsoft Technology Licensing, LLC, Redmond, WA (US)

(72) Inventors: Hamidreza Vaezi Joze, Redmond, WA (US); Vivek Pradeep, Redmond, WA (US); Karthik Vijayan, Berkshire (GB)

(73) Assignee: Microsoft Technology Licensing, LLC, Redmond, WA (US)

(*) Notice: Subject to any disclaimer, the term of this patent is extended or adjusted under 35 U.S.C. 154(b) by 37 days.

(21) Appl. No.: 18/435,405

(22) Filed: Feb. 7, 2024

(65) Prior Publication Data

US 2024/0184852 A1    Jun. 6, 2024

Related U.S. Application Data

(62) Division of application No. 17/314,466, filed on May 7, 2021, now abandoned.

(51) Int. Cl.
| | |
|---|---|
| *G06F 18/214* | (2023.01) |
| *G06F 18/21* | (2023.01) |
| *G06F 18/211* | (2023.01) |
| *G06N 3/04* | (2023.01) |
| *G06N 3/08* | (2023.01) |
| *G06V 40/10* | (2022.01) |
| *G06V 40/16* | (2022.01) |

(52) U.S. Cl.
CPC ........ *G06F 18/2148* (2023.01); *G06F 18/211* (2023.01); *G06F 18/2155* (2023.01); *G06F 18/2163* (2023.01); *G06N 3/04* (2013.01); *G06N 3/08* (2013.01); *G06V 40/10* (2022.01); *G06V 40/161* (2022.01); *G06V 2201/07* (2022.01)

(58) Field of Classification Search
CPC .............. G06F 18/2148; G06F 18/211; G06F 18/2155; G06F 18/2163; G06N 3/04; G06N 3/08; G06N 3/045; G06V 40/10; G06V 40/161; G06V 2201/07; G06V 10/255; G06V 10/454; G06V 10/82
See application file for complete search history.

(56) References Cited

U.S. PATENT DOCUMENTS

| | | | |
|---|---|---|---|
| 10,248,663 B1 * | 4/2019 | Keisler | G06F 16/29 |
| 10,610,098 B1 * | 4/2020 | Soliz | G06V 40/197 |

(Continued)

OTHER PUBLICATIONS

MobileNets, Howard et al 2017 (Year: 2017).*

*Primary Examiner* — Jianxun Yang

(57) ABSTRACT

A method of training a neural network for detecting target features in images is described. The neural network is trained using a first data set that includes labeled images, where at least some of the labeled images having subjects with labeled features, including: dividing each of the labeled images of the first data set into a respective plurality of tiles, and generating, for each of the plurality of tiles, a plurality of feature anchors that indicate target features within the corresponding tile. Target features that correspond to the plurality of feature anchors are detected in a second data set of unlabeled images. Images of the second data set having target features that were not detected are labeled. A third data set that includes the first data set and the labeled images of the second data set is generated. The neural network is trained using the third data set.

20 Claims, 11 Drawing Sheets

(56) References Cited

U.S. PATENT DOCUMENTS

2020/0125953 A1* 4/2020 Yoo .......................... G06N 5/04
2023/0232080 A1* 7/2023 Kim ..................... G06T 19/006
              382/155

* cited by examiner

NEURAL NETWORK TARGET FEATURE DETECTION

CROSS-REFERENCE TO RELATED APPLICATIONS

This application is a division of U.S. patent application Ser. No. 17/314,466, filed on May 7, 2021, the disclosure of which is hereby incorporated by reference in its entirety.

BACKGROUND

Face detection is one of the earliest computer vision algorithms used in industry. Currently, it is used in many applications including, for example, camera image signal processing, surveillance cameras, computer access authentications, robotics, and artificial intelligence based cameras. Many recent face detection algorithms rely upon machine learning approaches, such as neural networks, because of their accuracy. However, running time and power consumption of a neural network for face detection may keep this approach from being implemented on many in-device applications.

SUMMARY

In accordance with some examples of the present disclosure, a method of training a neural network for detecting target features in images is described. The neural network is trained using a first data set that includes labeled images, where at least some of the labeled images having subjects with labeled features, including: dividing each of the labeled images of the first data set into a respective plurality of tiles, and generating, for each of the plurality of tiles, a plurality of feature anchors that indicate target features within the corresponding tile. Target features that correspond to the plurality of feature anchors are detected in a second data set of unlabeled images. Images of the second data set having target features that were not detected are labeled. A third data set that includes the first data set and the labeled images of the second data set is generated. The neural network is trained using the third data set.

In accordance with some examples of the present disclosure, a system for training a neural network for detecting target features in images is described. The system comprises a processor, and a memory storing computer-executable instructions that when executed by the processor cause the system to: train the neural network using a first data set that includes labeled images, at least some of the labeled images having subjects with labeled features, including dividing each of the labeled images into a respective plurality of tiles, and generating, for each of the plurality of tiles, a plurality of feature anchors that indicate target features within the corresponding tile; detecting target features that correspond to the plurality of feature anchors in a second data set of unlabeled images; labeling images of the second data set having target features that were not detected; generating a third data set that includes the first data set of labeled images and the labeled images of the second data set; and training the neural network using the third data set.

In accordance with some examples of the present disclosure, an image processing system that includes a neural network implemented on a computer for feature detection is described. The image processing system includes a convolutional neural network having a plurality of layers stacked sequentially, including: a first set of layers, each layer of the first set of layers having a depth-wise convolution and a point-wise convolution, wherein the first set of layers is a first subset of a different neural network; and a second set of layers after the first set of layers, each layer of the second set of layers having a point-wise convolution.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Aspects of the present disclosure are directed to detecting target features in received images. For example, a computing device receives images from an image sensor and detects a body, face, eyes, hands, or other features of subjects within the images. In accordance with examples of the present disclosure, a computing device utilizes a feature detection engine that detects the target features using a neural network model. The feature detection engine may include a pre-processor that resizes an original image and changes one or more color parameters (e.g., color scale or color representation) to generate an input image for the neural network model. The feature detection engine may also include a post-processor that separates information for different detected target features and scales respective bounding boxes for the target features to the original image.

Figure 1:
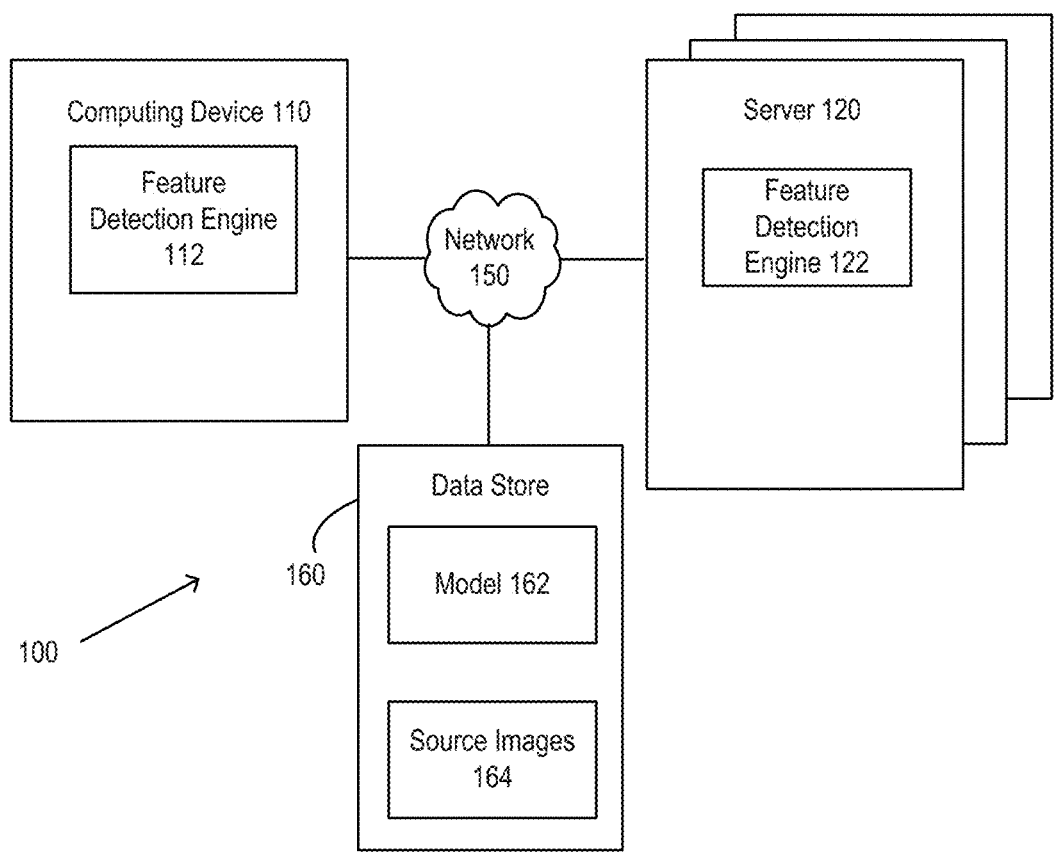
FIG. 1 depicts an example of an image processing system that is configured to detect target features of subjects, according to an embodiment.

In accordance with embodiments of the present disclosure, FIG. 1 depicts an example of an image processing system 100 that is configured to detect target features in images. Example target features include bodies, faces, eyes, hands, or other features of people or animals, in various embodiments. In some embodiments, the image processing system 100 is configured to detect both faces and bodies of people. In other embodiments, different combinations of target features may be detected by the image processing system according to labels that are associated with images for training, as described below. The image processing system 100 includes a computing device 110 and a server 120. In some embodiments, the image processing system 100 also includes a data store 160. A network 150 communicatively couples computing device 110, server 120, and data store 160. The network 150 may comprise one or more networks such as local area networks (LANs), wide area networks (WANs), enterprise networks, the Internet, etc., and may include one or more of wired, wireless, and/or optical portions.

Computing device 110 may be any type of computing device, including a mobile computer or mobile computing device (e.g., a Microsoft® Surface® device, a laptop computer, a notebook computer, a tablet computer such as an Apple iPad™, a netbook, etc.), or a stationary computing device such as a desktop computer or PC (personal computer). Computing device 110 may be configured to execute one or more software applications (or "applications") and/or services and/or manage hardware resources (e.g., processors, memory, etc.), which may be utilized by users (e.g., customers) of the server 120. Server 120 may include one or more server devices, distributed computing platforms, and/or other computing devices.

The computing device 110 may include a feature detection engine 112 that receives images and processes those images to detect and identify target features. In some scenarios, the feature detection engine 112 provides a bounding box that surrounds a detected target feature. In an embodiment, the feature detection engine 112 is configured to utilize a neural network model, such as a neural network model 162, described below. The server 120 includes a feature detection engine 122, which may be the same, or similar to, the feature detection engine 112.

In accordance with examples of the present disclosure, the feature detection engine 112 may receive one or more images and provide them to a neural network model executing at a neural processing unit. The neural network model may output detection information for one or more detected target features, as described below. Because the neural processing unit is specifically designed and/or programmed to process neural network tasks, the consumption of resources, such as power and/or computing cycles, is less than the consumption would be if a central processing unit were used.

The data store 160 is configured to store data, for example, the neural network model 162 and source images 164. In various embodiments, the data store 160 is a network server, cloud server, network attached storage ("NAS") device, or other suitable computing device. Data store 160 may include one or more of any type of storage mechanism, including a magnetic disc (e.g., in a hard disk drive), an optical disc (e.g., in an optical disk drive), a magnetic tape (e.g., in a tape drive), a memory device such as a random access memory (RAM) device, a read-only memory (ROM) device, etc., and/or any other suitable type of storage medium. Although only one instance of the data store 160 is shown in FIG. 1, the image processing system 100 may include two, three, or more similar instances of the data store 160. Moreover, the network 150 may provide access to other data stores, similar to data store 160 that are located outside of the image processing system 100, in some embodiments.

The neural network model 162 is configured to detect target features in received images. In some scenarios, the neural network model 162 is trained to detect target features using the source images 164. For example, the source images 164 include various images, at least some of which include bodies, faces, eyes, hands, or other features of subjects (e.g., people or animals) within the image, and the neural network model 162 is trained to determine a bounding box for the detected target feature. In some embodiments, the neural network model 162 is also configured to determine a confidence level of the detection (e.g., 95% confident). The data store 160 includes a neural network model 162 and source images 164 for training the neural network model 162, in some embodiments. In other embodiments, the source images 164 are omitted from the data store 160, but are stored in another suitable storage.

Figure 2:
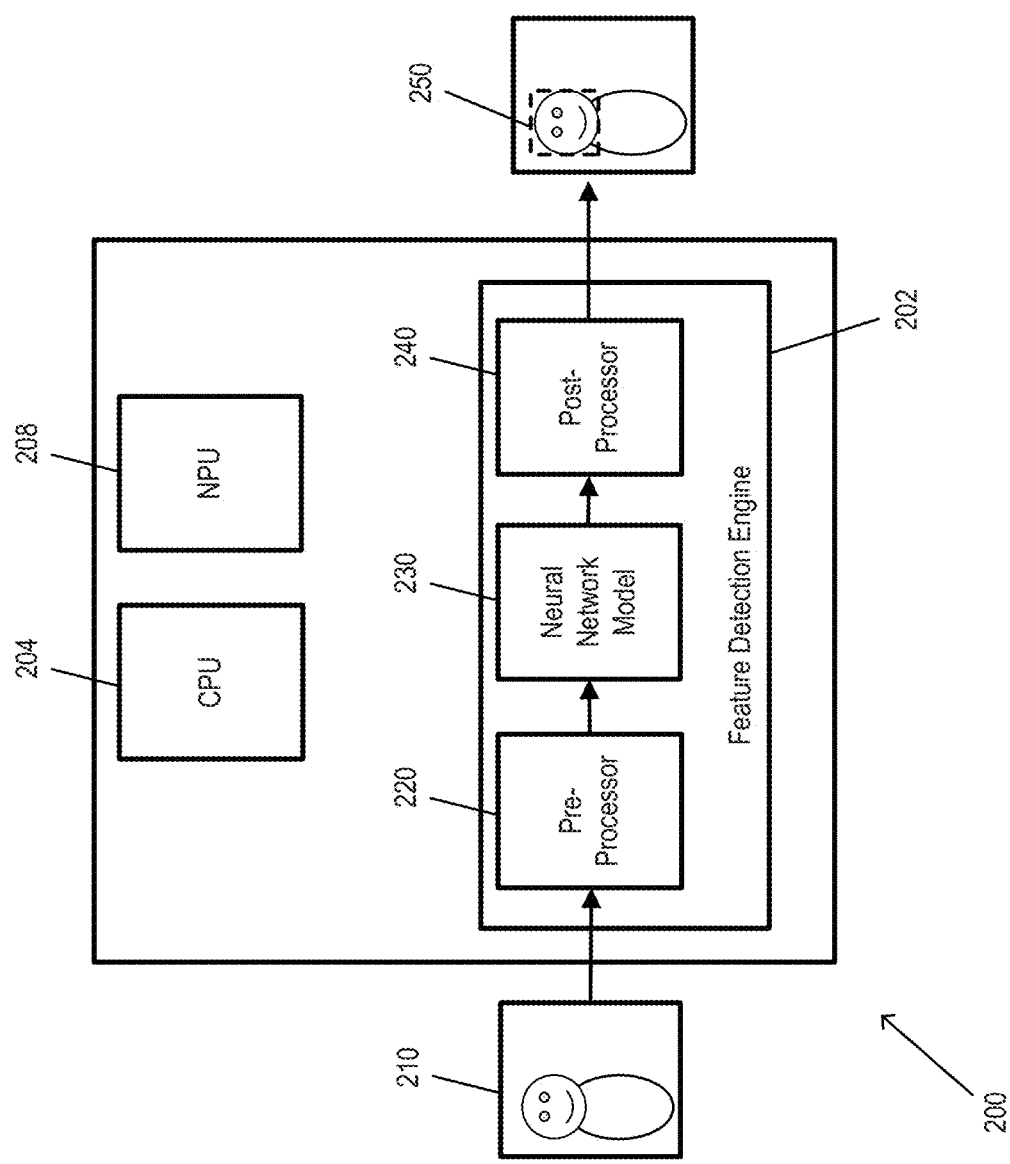
FIG. 2 depicts an example of a computing device that includes a feature detection engine configured to detect target features of subjects, according to an embodiment.

FIG. 2 depicts an example of a computing device 200 that includes a feature detection engine 202 configured to detect target features of subjects in an original image 210, according to an embodiment. The computing device 200 may correspond to the computing device 110 and/or server 120 and the feature detection engine 202 may correspond to the feature detection engine 112 and/or 122, in various embodiments. The computing device 200 may also include a central processing unit (CPU) 404 and a neural processing unit (NPU) 408. The feature detection engine 202 includes a pre-processor 220, a neural network model 230, and a post-processor 240. The pre-processor 220 is configured to resize an original image and change one or more color parameters (e.g., color scale or color representation) to generate an input image for the neural network model 230. The neural network model 230 generally corresponds to the neural network model 162, in an embodiment. The post-processor 240 is configured to receive and process an output from the neural network model 230 and provide estimated feature locations for the target features, for example, as a bounding box 250 around a detected face.

In some embodiments, the feature detection engine 202 may execute processing at the CPU 204, without utilizing the NPU 208. In one such embodiment, a structure of the neural network model 230 is readily executed by the CPU 204 and the NPU 208 is omitted from the computing device 200. In other embodiments, the feature detection engine 202 may execute processing at the CPU 204 and/or the NPU 208. For example, processing of the neural network model 230 may occur at the NPU 408. The NPU 208, being configured to efficiently execute processing associated with neural network models, may allow the feature detection engine 202 to operate in or near real-time such that a face or body of a subject within an image may be detected in or near real-time without consuming resources traditionally expended by the CPU 204.

Figure 3:
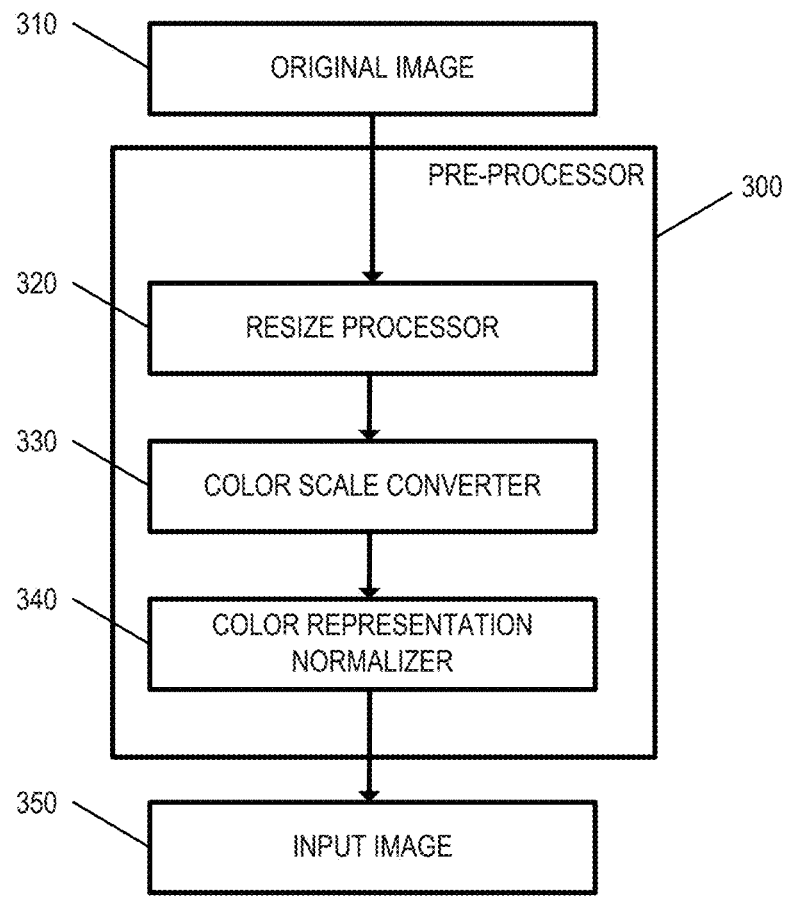
FIG. 3 depicts an example of a pre-processor for a feature detection engine, according to an embodiment.

FIG. 3 depicts an example of a pre-processor 300 for a feature detection engine, according to an embodiment. The pre-processor 300 may correspond to the pre-processor 220 of the feature detection engine 202, in some embodiments. The pre-processor 300 includes a resize processor 320, a color scale converter 330, and a color representation normalizer 340. The resize processor 320 receives an original image 310 (e.g., a source image 164, original image 210) and resizes the original image 310 according to a structure of the neural network model 230. In the embodiments described herein, the neural network model 162 and neural network model 230 are configured to process images of size 352×352 pixels with three values that represent color (red, green, blue) at each pixel. Accordingly, the resize processor 320 is configured to resize the original image to 352×352 pixels. The resize processor 320 is configured to perform bilinear interpolation, bicubic interpolation, sinc resampling, box sampling, or other suitable resize procedures to resize the original image, in various embodiments.

After resizing the original image 310, the color scale converter 330 converts a color scale of the resized image to an RGB planar format, in some embodiments. In this format, color data for an individual pixel is spread across different bitplanes. In some embodiments, the color scale converter 330 is omitted. The color representation normalizer 340 normalizes the colors for each pixel of the resized image to have values from −1 to +1 as a floating point value, instead of an integer value of 0 to 255. In other words, the color representation normalizer 340 maps a red value of 255 to a value of 1.0 and maps a red value of 0 to −1.0. The resized, color converted, and normalized image is referred to as the input image 350, which is provided to the neural network model (e.g., neural network model 230).

Figure 4:
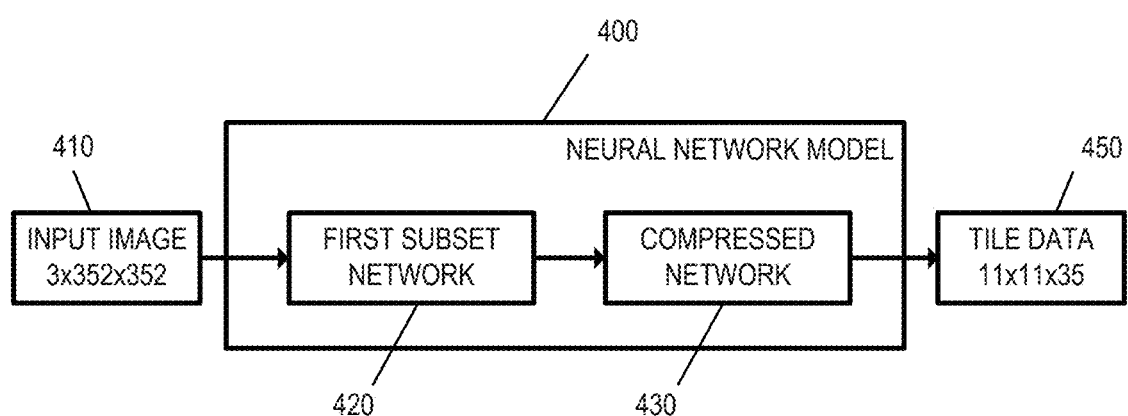
FIG. 4 depicts an example of a neural network model for a feature detection engine, according to an embodiment.

FIG. 4 depicts an example of a neural network model 400 for a feature detection engine, according to an embodiment. The neural network model 400 generally corresponds to the neural network model 162 and/or 230, in some embodiments. The neural network model 400 is configured to process an input image 410 and detect target features in the input image. The neural network model 400 divides images into a plurality of tiles and generates a plurality of feature anchors based on an input image. The neural network model 400 is configured to divide the input image 410 into a matrix of 11×11 tiles (121 total tiles) where each tile has a height of 32 pixels and a width of 32 pixels. In other embodiments, a different number of tiles are used, for example, 8×8 (64 tiles), 15×15 (225 tiles), or other suitable number of tiles.

Each of the tiles corresponds to a respective plurality of feature anchors, where a feature anchor is a data structure that represents a possible location within the tile where an instance of a corresponding feature may be located. In the embodiments described herein, a feature anchor includes five elements: an x coordinate, a y coordinate, a width, a height, and a confidence level. In some examples, the x, y coordinates indicate a center of a bounding box that contains the target feature and has the corresponding width and height. In other embodiments, the x, y coordinates of the feature anchor correspond to a different reference point for the bounding box, for example, an upper left corner, lower right corner, etc. As described above, a target feature may be a face, body, or other element of a subject within the input image. Accordingly, the feature anchors may correspond to face anchors for detecting human faces, body anchors for detecting human bodies, or combinations of both face and body anchors. In the embodiments described herein, the neural network model 400 utilizes seven total anchors, with 5 anchors for body detection and 2 anchors for face detection. In other words, the body anchors indicate a possible location of a body within a tile and the face anchors indicate a possible location of a face within the tile.

The neural network model 400 outputs the feature anchors as tile data 450 having dimensions of A×B×C, where A×B corresponds to the number of tiles and C corresponds to five times a maximum number of target features that may be detected within each tile. In other words, tiles of 11×11 with seven feature anchors corresponds to tile data 450 having dimensions of 11×11×35.

Although existing neural networks are able to detect faces and other features, their speed and complexity may not allow for their use on computing devices without dedicated neural network processing capabilities. The neural network model 400 overcomes this limitation by including a neural network having a plurality of layers stacked sequentially, formed from a first subset network 420 and a "compressed" network 430. The first subset network 420 includes a first set of layers that represents a first subset of a different neural network, such as the MobileNet neural network, and a second set of layers that is based upon a compression of a remainder subset of the different neural network.

The MobileNet neural network generally includes 13 convolution layers, where each layer includes a depth-wise convolution and a point-wise convolution. In the neural network model 400, the first subset network 420 includes only a first four layers of the MobileNet neural network, with an output of these layers being provided to the compressed network 430, which includes a modified, compressed representation of a remaining nine layers of the MobileNet neural network. In some scenarios, the MobileNet neural network may be reduced in computational cost and the number of parameters using a width multiplier that reduces complexity at each layer. However, this approach also reduces accuracy. Rather than simply reducing a "width" of each layer, the neural network model 400 uses the first four convolution layers without modification, but remaining convolution layers (9 layers) are compressed to a point-wise convolution (i.e., instead of a depth-wise convolution and point-wise convolution).

Figure 5:
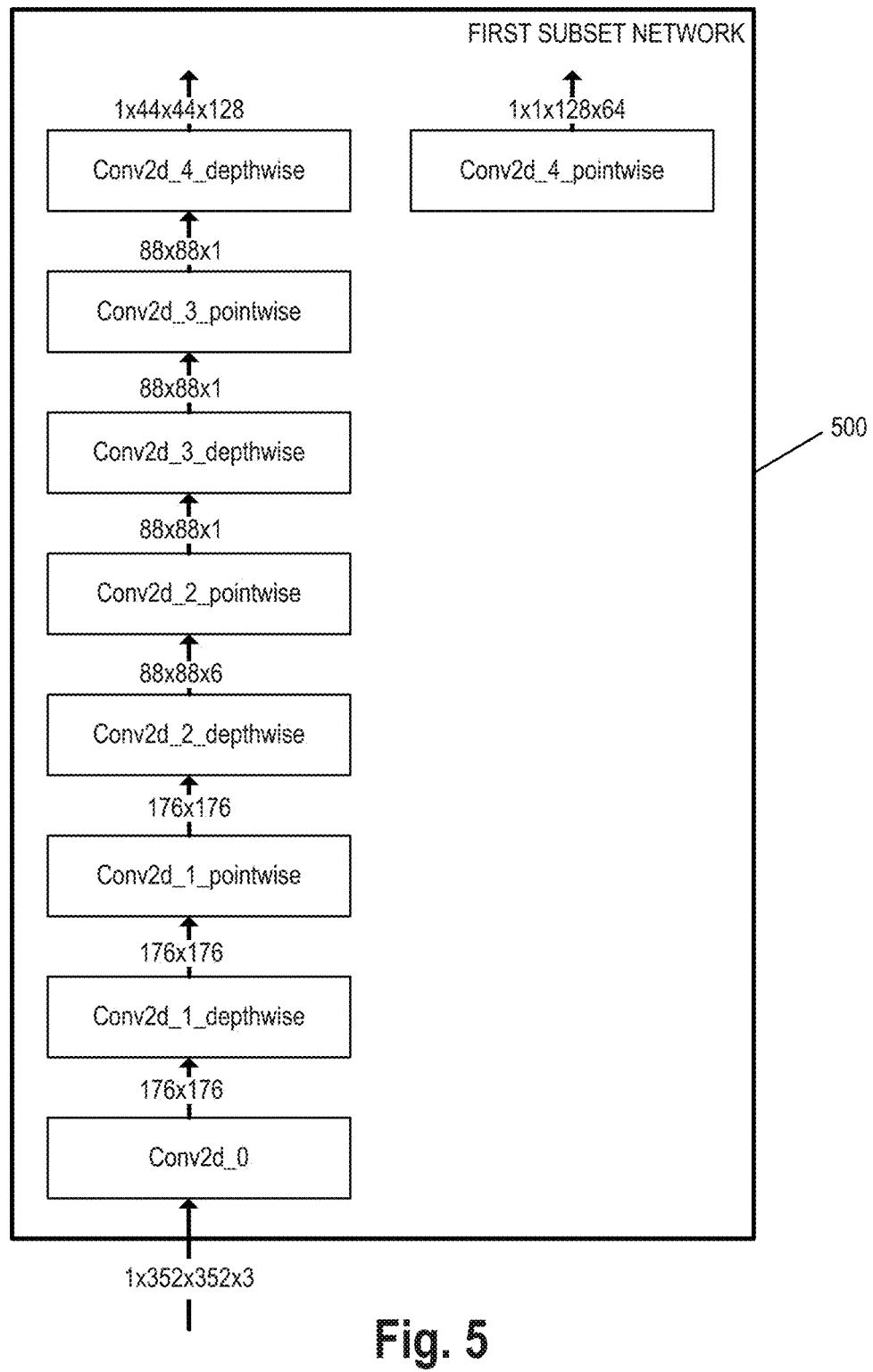
FIG. 5 depicts an example of a neural network for detecting target features of an image, according to an embodiment.

FIG. 5 depicts an example of a neural network 500 for detecting target features of an image, according to an embodiment. The neural network 500 generally corresponds to the first subset network 420 of the neural network model 400 and illustrates the first four layers of the MobileNet neural network. Although the neural network 500 includes four layers of the MobileNet neural network, in other embodiments, the neural network 500 includes a larger subset of the MobileNet neural network, for example, five, six, or more layers.

Figure 6:
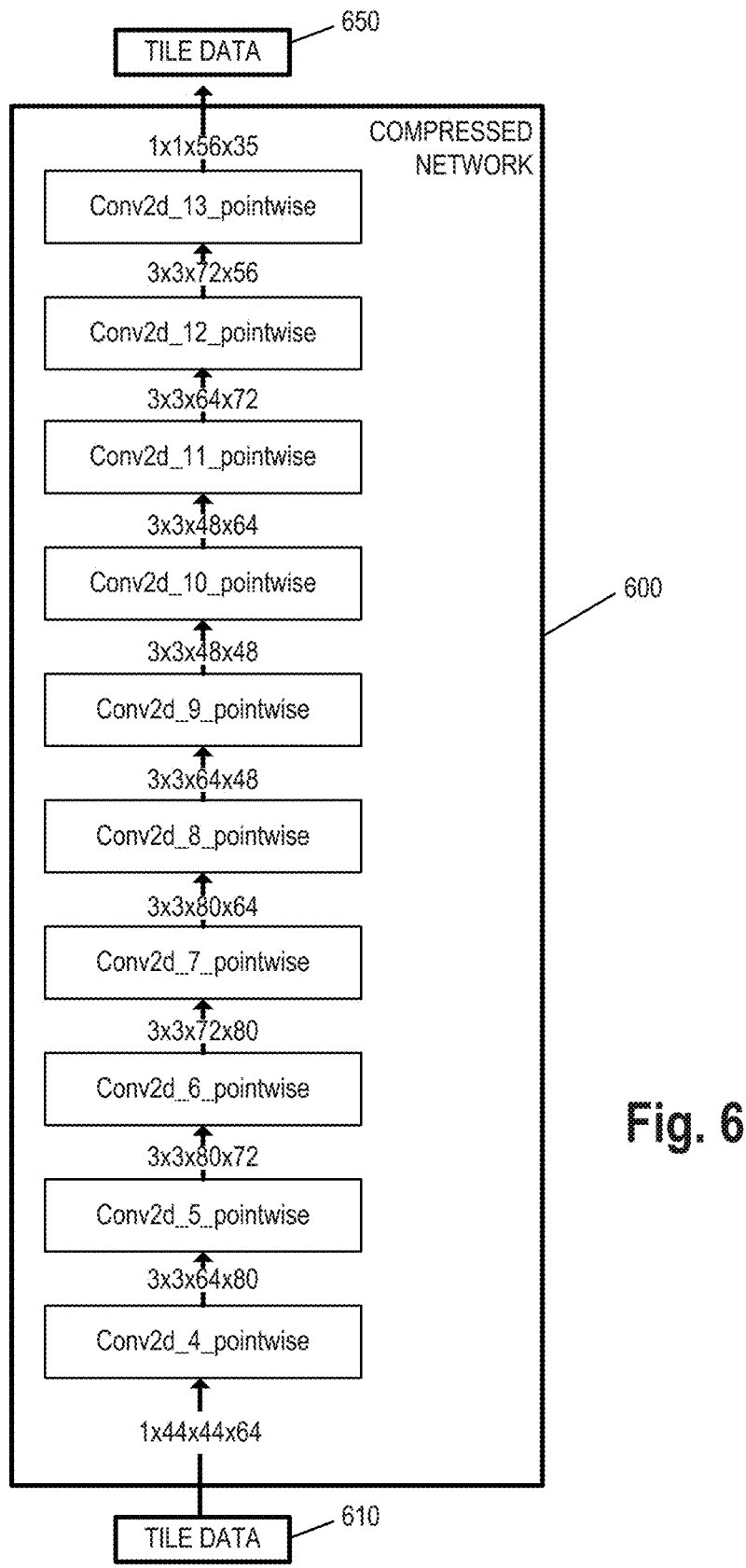
FIG. 6 depicts an example of a neural network for a feature detection engine, according to an embodiment.

FIG. 6 depicts an example of a neural network 600 for a feature detection engine, according to an embodiment. The neural network 600 generally corresponds to the compressed network 430 of the neural network model 400. In the illustrated embodiment, the neural network 600 includes layers four through thirteen of point-wise convolutions.

Figure 7:
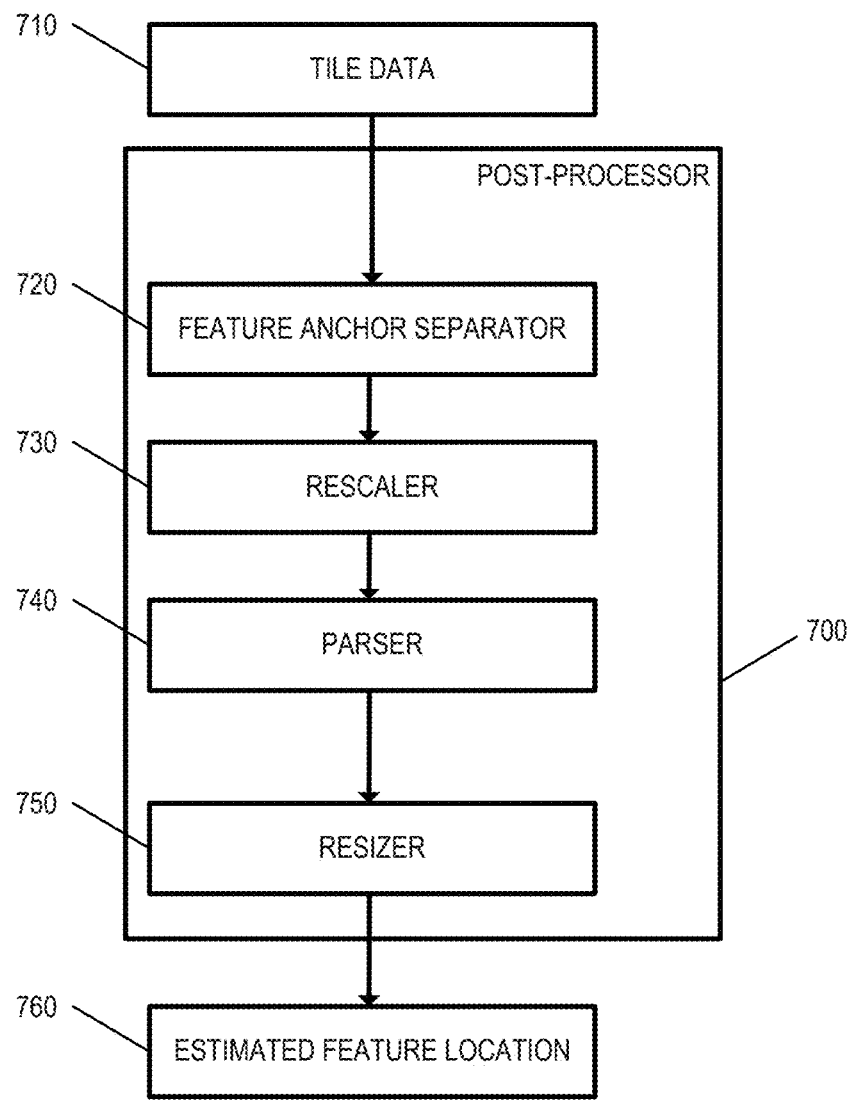
FIG. 7 depicts an example of a post-processor for a feature detection engine, according to an embodiment.

FIG. 7 depicts an example of a post-processor 700 for a feature detection engine, according to an embodiment. The post-processor 700 generally corresponds to the post-processor 240, in some embodiments. The post-processor 700 receives tile data 710 from a neural network model and converts the tile data 710 to estimate feature locations 760. In an embodiment, for example, the post-processor 700 receives tile data 450 from the neural network model 400 or the tile data 650 from the neural network 600. The tile data 710 may be a binary output having dimensions of 11×11×35, corresponding to a set of feature anchors for each tile. These dimensions correspond to the example embodiment where the input image is divided into 11×11 tiles, with each tile having seven feature anchors (×35, for seven feature anchors each having five values). In other embodiments having different numbers of tiles and feature anchors, the dimensions of the tile data 710 are adjusted accordingly, for example, the tile data 710 may have dimensions of 8×8×10 for 8×8 tiles with two feature anchors.

The post-processor 700 includes a feature anchor separator 720, a rescaler 730, a parser 740, and a resizer 750. The feature anchor separator 720 splits the binary format of the tile data 710 into separate feature anchors having an x coordinate, y coordinate, width, height, and confidence level. After splitting, the rescaler 730 rescales the x, y coordinates and confidence level of the feature anchors using a sigmoid function. The parser 740 parses the bounding boxes defined by the x, y coordinates, height, and width and removes bounding boxes with confidence levels that do not meet a minimum confidence threshold (e.g., discard those having less than 80% confidence). For those bounding boxes that meet the minimum confidence threshold, the resizer 750 resizes the bounding box relative to the size of the original image. As an example, when the size of the original image is 1920×1080 which has been resized down to 352×352 by the pre-processor 300, the resizer 750 resizes a bounding box of 12×14 pixels to a bounding box of 65×43 pixels and provides the estimated feature locations as a list of arrays.

Figure 8:
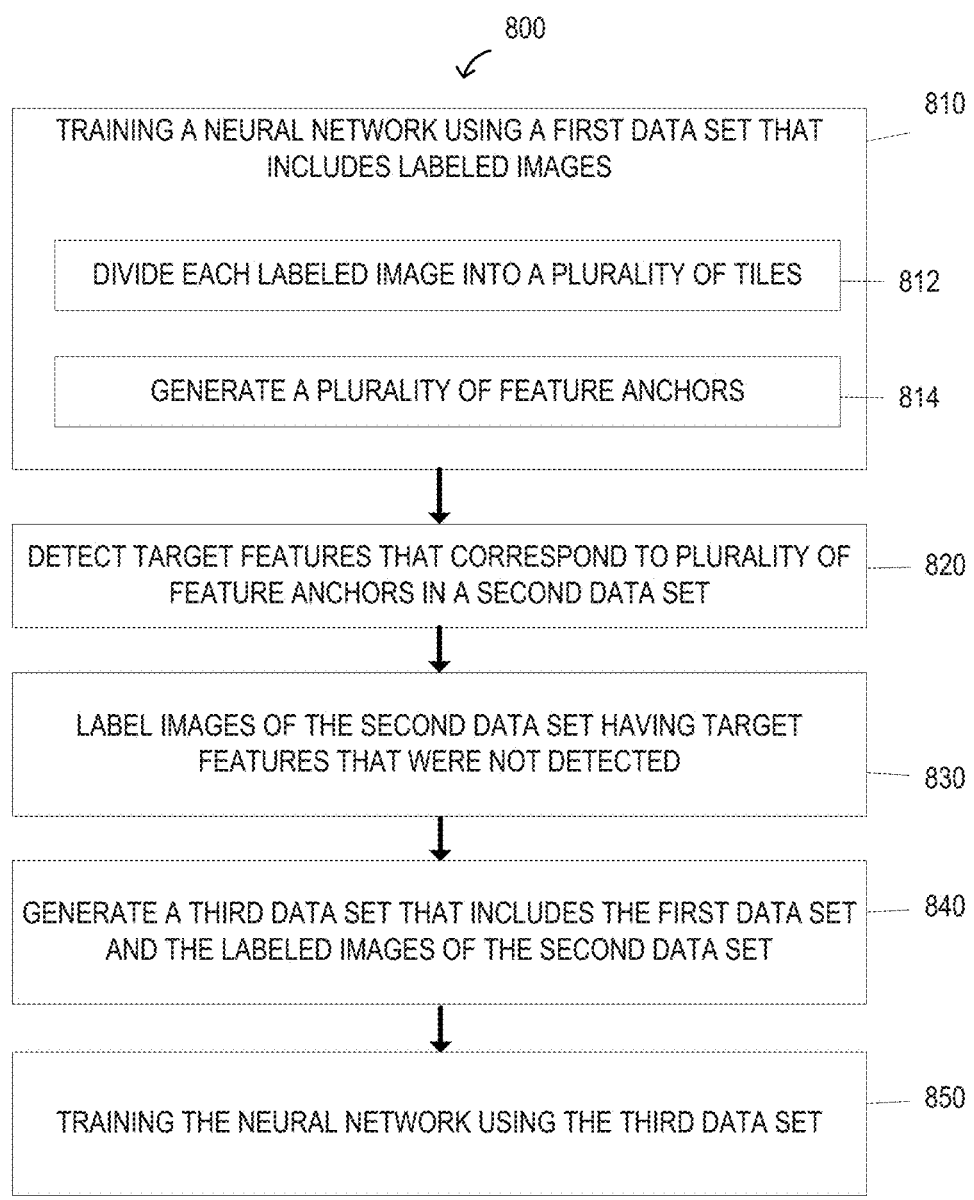
FIG. 8 depicts details of a method of training a neural network for detecting target features in images, according to an embodiment.

FIG. 8 depicts details of a method 800 for training a neural network for detecting target features in images, according to an embodiment. A general order for the steps of the method 800 is shown in FIG. 8. The method 800 may include more or fewer steps or may arrange the order of the steps differently than those shown in FIG. 8. The method 800 can be executed as a set of computer-executable instructions executed by a computer system and encoded or stored on a computer readable medium. In examples, aspects of the method 800 are performed by one or more processing devices, such as a computer or server. Further, the method 800 can be performed by gates or circuits associated with a processor, Application Specific Integrated Circuit (ASIC), a field programmable gate array (FPGA), a system on chip (SOC), a neural processing unit, or other hardware device. Hereinafter, the method 800 shall be explained with reference to the systems, components, modules, software, data structures, user interfaces, etc. described in conjunction with FIGS. 1-7.

The method starts at step 810, where the neural network is trained using a first data set that includes labeled images. In various embodiments, the neural network corresponds to the neural network models 162, 230, and/or 400. At least some of the labeled images have subjects with labeled features. In some embodiments, the first data set corresponds to a 2017 COCO dataset for face and body.

Training the neural network also includes dividing (step 812) each of the labeled images of the first data set into a respective plurality of tiles and generating (step 814), for each of the plurality of tiles, a plurality of feature anchors that indicate target features within the corresponding tile. In some embodiments, each of the plurality of feature anchors indicates a bounding box within the corresponding tile that contains a target feature. In some examples, the bounding box corresponds to the bounding box 250. In some embodiments, the target features include a subject face and/or subject body.

In some embodiments, training the neural network using the first data set of labeled images includes normalizing RGB values of the labeled images from 0 to 255 to −1 to 1. In an embodiment, for example, the color representation normalizer 340 normalizes the RGB values.

At step 820, target features that correspond to the plurality of feature anchors are detected in a second data set of unlabeled images. In some embodiments, the second data set is generated to include images from videos without people. In some scenarios, by using images without people (and thus without target features), the second data set is configured to evoke false positive detections of target features. In an embodiment, the second data set is generated to include images from videos that depict subjects with different head poses. For example, the videos depict different subjects rotating their face in different directions in front of a camera. In some scenarios, these images provide improved detection accuracy for images where a subject is not looking directly into the camera.

At step 830, images of the second data set having target features that were not detected are labeled. For example, images of the second data set having a face or body are labeled with bounding boxes that surround the target feature. In some embodiments, labeling the target features that were not detected is performed manually. In other embodiments, a different neural network is used to label the target features that were not detected.

At step 840, a third data set that includes the first data set and the labeled images of the second data set is generated. In some embodiments, the third data set is generated to include images of the second data set that correspond to false positive detections of the target features. In other words, after inserting images into the second data set that evoke false positives, those false positives are then used to retrain and improve the accuracy of the neural network.

In some embodiments, generating the third data set includes performing a randomized crop of different aspect ratios on at least some of the third data set. As discussed above, the original image is resized to 352×352 as an input image to be provided to the neural network model, so the original image may be stretched horizontally or vertically based on its aspect ratio. By introducing a randomized crop of different aspect ratios on some images, the neural network model is made to be more robust against a range of input image aspect ratios. The different aspect ratios may include, for example, 16:9, 4:3, 1:1, 3:4, 9:16, or other suitable aspect ratios.

In some embodiments, generating the third data set includes generating at least some images having light levels below a low light threshold, which further includes augmenting an image of the third data set to have light levels below the low light threshold. In other words, some images are augmented to have lower light levels than their original light levels, which allows the neural network model to be trained to have improved detection of target features in low light conditions.

In some embodiments, generating the third data set includes generating at least some images having partially occluded target features, which further includes augmenting an image of the third data set to have a partially occluded target feature. In other words, an image of a complete face may be augmented to "hide" at least part of the face, which allows the neural network model to be trained to have improved detection of target features that are hidden by obstructions (e.g., a face mask, a hand over a lens). In one such embodiment, augmenting the image includes cropping the image or inserting a block into the image to obtain the partially occluded target feature.

At step 850, the neural network is trained using the third data set.

In some embodiments, training the neural network using the third data set includes training the neural network using floating point values for weights of the neural network. In an embodiment, the method further includes quantizing the weights of the neural network using integers. In some scenarios, this approach reduces processing times for detection of the target features on processors that do not have a neural processing unit, allowing the neural network to be used on a wider range of computing devices.

In some embodiments, the steps 820, 830, 840, and 850 are repeated one or more times to further improve the detection accuracy of the neural network models 162, 230, and/or 400.

Figure 9:
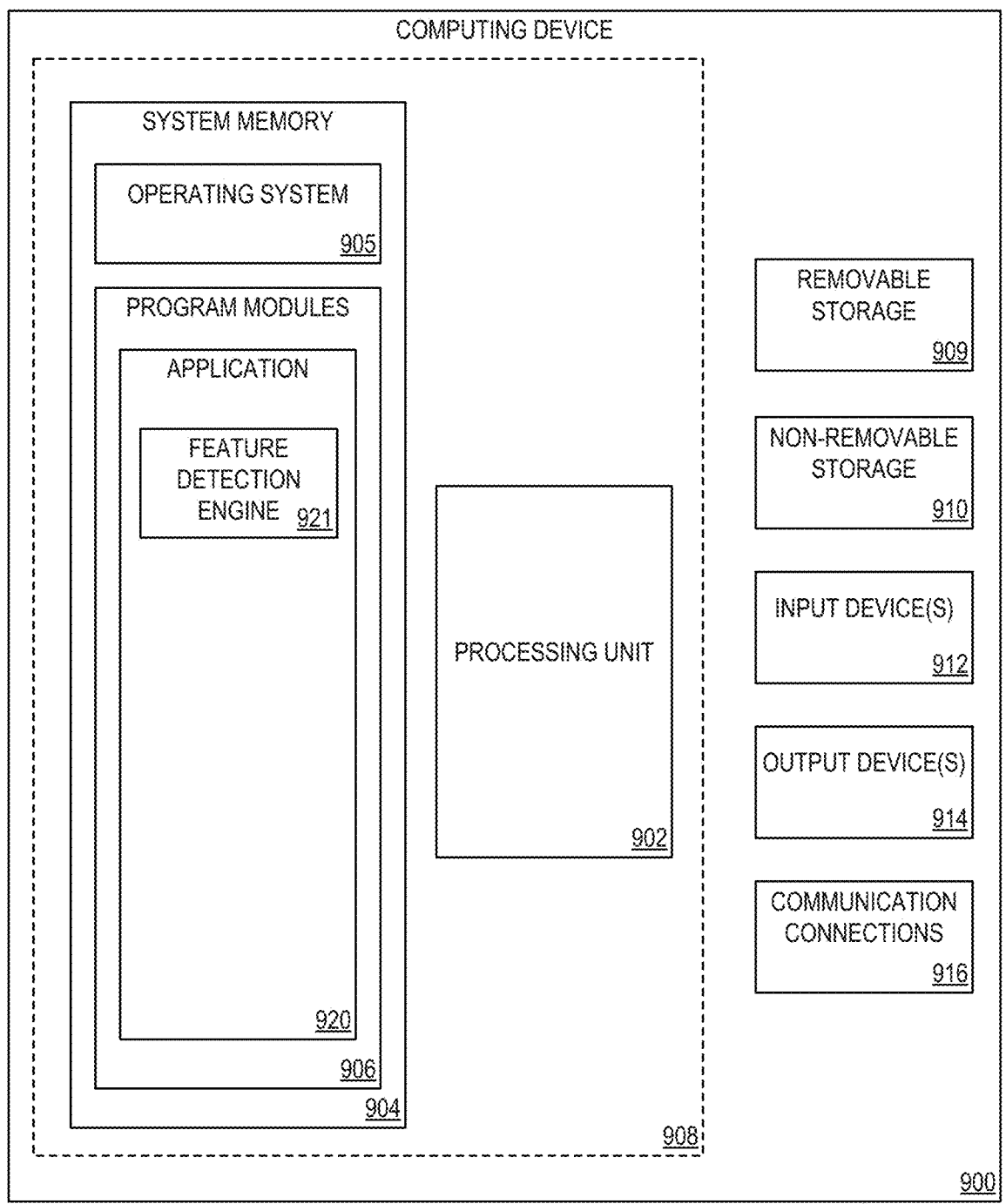
FIG. 9 is a block diagram illustrating physical components (e.g., hardware) of a computing device with which aspects of the disclosure may be practiced.

FIG. 9 is a block diagram illustrating physical components (e.g., hardware) of a computing device 900 with which aspects of the disclosure may be practiced. The computing device components described below may have computer executable instructions for implementing a feature detection application 920 on a computing device (e.g., computing device 110, server 120), including computer executable instructions for feature detection application 920 that can be executed to implement the methods disclosed herein. In a basic configuration, the computing device 900 may include at least one processing unit 902 and a system memory 904. Depending on the configuration and type of computing device, the system memory 904 may comprise, but is not limited to, volatile storage (e.g., random access memory), non-volatile storage (e.g., read-only memory), flash memory, or any combination of such memories. The system memory 904 may include an operating system 905 and one or more program modules 906 suitable for running feature detection application 920, such as one or more components with regard to FIGS. 1-2 and, in particular, feature detection engine 112 and/or 122.

The operating system 905, for example, may be suitable for controlling the operation of the computing device 900. Furthermore, embodiments of the disclosure may be practiced in conjunction with a graphics library, other operating systems, or any other application program and is not limited to any particular application or system. This basic configuration is illustrated in FIG. 9 by those components within a dashed line 908. The computing device 900 may have additional features or functionality. For example, the computing device 900 may also include additional data storage devices (removable and/or non-removable) such as, for example, magnetic disks, optical disks, or tape. Such additional storage is illustrated in FIG. 9 by a removable storage device 909 and a non-removable storage device 910.

As stated above, a number of program modules and data files may be stored in the system memory 904. While executing on the processing unit 902, the program modules 906 (e.g., feature detection application 920) may perform processes including, but not limited to, the aspects, as described herein. Other program modules that may be used in accordance with aspects of the present disclosure, and in particular for feature detection application 920, may include feature detection engine 921, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 900 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 900 may also have one or more input device(s) 912 such as a keyboard, a mouse, a pen, a sound or voice input device, a touch or swipe input device, etc. The output device(s) 914 such as a display, speakers, a printer, etc. may also be included. The aforementioned devices are examples and others may be used. The computing device 900 may include one or more communication connections 916 allowing communications with other computing devices 950. Examples of suitable communication connections 916 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 904, the removable storage device 909, and the non-removable storage device 910 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 900. Any such computer storage media may be part of the computing device 900. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 10:
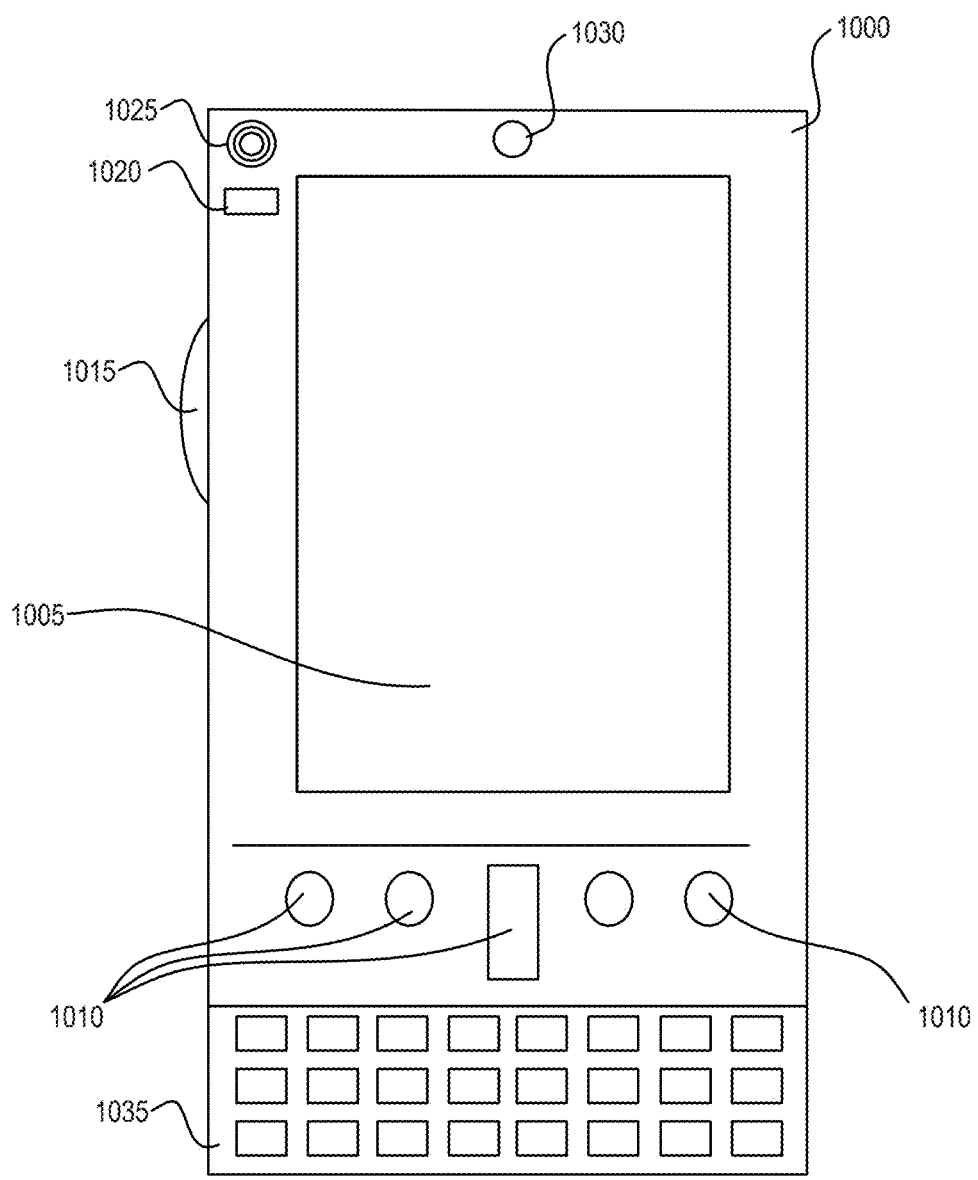
FIGS. 10 and 11 illustrate a mobile computing device, according to an embodiment.
Figure 11:
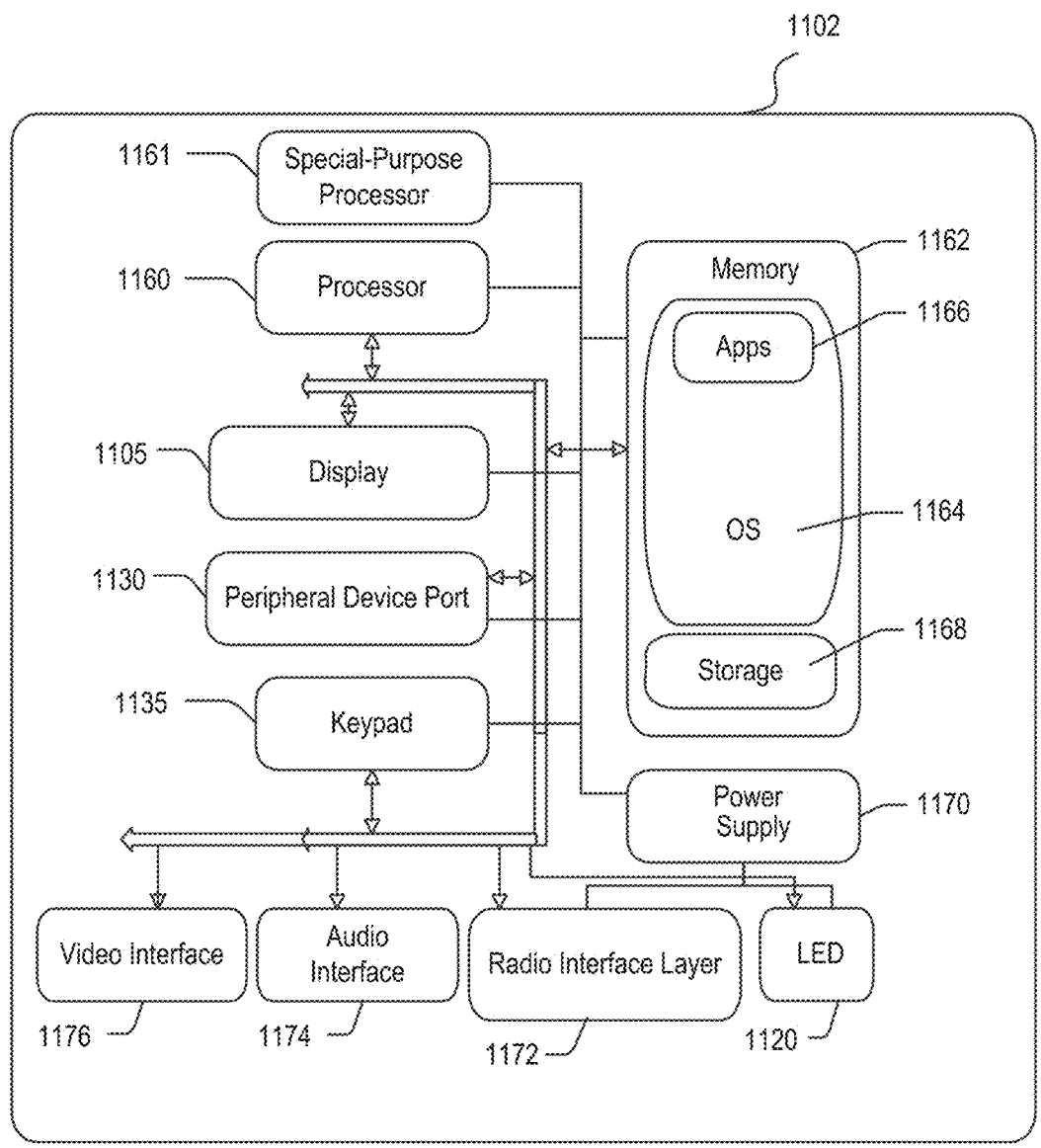

FIGS. 10 and 11 illustrate a mobile computing device 1000, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 10, one aspect of a mobile computing device 1000 for implementing the aspects is illustrated. In a basic configuration, the mobile computing device 1000 is a handheld computer having both input elements and output elements. The mobile computing device 1000 typically includes a display 1005 and one or more input buttons 1010 that allow the user to enter information into the mobile computing device 1000. The display 1005 of the mobile computing device 1000 may also function as an input device (e.g., a touch screen display). If included, an optional side input element 1015 allows further user input. The side input element 1015 may be a rotary switch, a button, or any other type of manual input element. In alternative aspects, mobile computing device 1000 may incorporate more or less input elements. For example, the display 1005 may not be a touch screen in some embodiments. In yet another alternative embodiment, the mobile computing device 1000 is a portable phone system, such as a cellular phone. The mobile computing device 1000 may also include an optional keypad 1035. Optional keypad 1035 may be a physical keypad or a "soft" keypad generated on the touch screen display. In various embodiments, the output elements include the display 1005 for showing a graphical user interface (GUI), a visual indicator 1020 (e.g., a light emitting diode), and/or an audio transducer 1025 (e.g., a speaker). In some aspects, the mobile computing device 1000 incorporates a vibration transducer for providing the user with tactile feedback. In yet another aspect, the mobile computing device 1000 incorporates input and/or output ports, such as an audio input (e.g., a microphone jack), an audio output (e.g., a headphone jack), and a video output (e.g., a High-Definition Multimedia Interface port) for sending signals to or receiving signals from an external device.

FIG. 11 is a block diagram illustrating the architecture of one aspect of a mobile computing device. That is, the mobile computing device 1000 can incorporate a system (e.g., an architecture) 1002 to implement some aspects. In one embodiment, the system 1002 is implemented as a "smart phone" capable of running one or more applications (e.g., browser, e-mail, calendaring, contact managers, messaging clients, games, and media clients/players). In some aspects, the system 1002 is integrated as a computing device, such as an integrated personal digital assistant (PDA) and wireless phone.

One or more application programs 1066 may be loaded into the memory 1062 and run on or in association with the operating system 1064. Examples of the application programs include phone dialer programs, e-mail programs, personal information management (PIM) programs, word processing programs, spreadsheet programs, Internet browser programs, messaging programs, and so forth. The system 1002 also includes a non-volatile storage area 1068 within the memory 1062. The non-volatile storage area 1068 may be used to store persistent information that should not be lost if the system 1002 is powered down. The application programs 1066 may use and store information in the non-volatile storage area 1068, such as email or other messages used by an email application, and the like. A synchronization application (not shown) also resides on the system 1002 and is programmed to interact with a corresponding synchronization application resident on a host computer to keep the information stored in the non-volatile storage area 1068 synchronized with corresponding information stored at the host computer. As should be appreciated, other applications may be loaded into the memory 1062 and run on the mobile computing device 1000, including the instructions for allocating traffic to communication links (e.g., offline routing engine, online routing engine, etc.).

The system 1002 has a power supply 1070, which may be implemented as one or more batteries. The power supply 1070 may further include an external power source, such as an AC adapter or a powered docking cradle that supplements or recharges the batteries.

The system 1002 may also include a radio interface layer 1072 that performs the function of transmitting and receiving radio frequency communications. The radio interface layer 1072 facilitates wireless connectivity between the system 1002 and the "outside world," via a communications carrier or service provider. Transmissions to and from the radio interface layer 1072 are conducted under control of the operating system 1064. In other words, communications received by the radio interface layer 1072 may be disseminated to the application programs 1066 via the operating system 1064, and vice versa.

The visual indicator 1020 may be used to provide visual notifications, and/or an audio interface 1074 may be used for producing audible notifications via an audio transducer 1025 (e.g., audio transducer 1025 illustrated in FIG. 10). In the illustrated embodiment, the visual indicator 1020 is a light emitting diode (LED) and the audio transducer 1025 may be a speaker. These devices may be directly coupled to the power supply 1070 so that when activated, they remain on for a duration dictated by the notification mechanism even though the processor 1060 and other components might shut down for conserving battery power. The LED may be programmed to remain on indefinitely until the user takes action to indicate the powered-on status of the device. The audio interface 1074 is used to provide audible signals to and receive audible signals from the user. For example, in addition to being coupled to the audio transducer 1025, the audio interface 1074 may also be coupled to a microphone to receive audible input, such as to facilitate a telephone conversation. In accordance with embodiments of the present disclosure, the microphone may also serve as an audio sensor to facilitate control of notifications, as will be described below. The system 1002 may further include a video interface 1076 that enables an operation of peripheral device 1030 (e.g., on-board camera) to record still images, video stream, and the like.

A mobile computing device 1000 implementing the system 1002 may have additional features or functionality. For example, the mobile computing device 1000 may also include additional data storage devices (removable and/or non-removable) such as, magnetic disks, optical disks, or tape. Such additional storage is illustrated in FIG. 11 by the non-volatile storage area 1068.

Data/information generated or captured by the mobile computing device 1000 and stored via the system 1002 may be stored locally on the mobile computing device 1000, as described above, or the data may be stored on any number of storage media that may be accessed by the device via the radio interface layer 1072 or via a wired connection between the mobile computing device 1000 and a separate computing device associated with the mobile computing device 1000, for example, a server computer in a distributed computing network, such as the Internet. As should be appreciated such data/information may be accessed via the mobile computing device 1000 via the radio interface layer 1072 or via a distributed computing network. Similarly, such data/information may be readily transferred between computing devices for storage and use according to well-known data/information transfer and storage means, including electronic mail and collaborative data/information sharing systems.

As should be appreciated, FIGS. 10 and 11 are described for purposes of illustrating the present methods and systems and is not intended to limit the disclosure to a particular sequence of steps or a particular combination of hardware or software components.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically.

The exemplary systems and methods of this disclosure have been described in relation to computing devices. However, to avoid unnecessarily obscuring the present disclosure, the preceding description omits a number of known structures and devices. This omission is not to be construed as a limitation. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infrared data communications.

While the flowcharts have been discussed and illustrated in relation to a particular sequence of events, it should be appreciated that changes, additions, and omissions to this sequence can occur without materially affecting the operation of the disclosed configurations and aspects.

A number of variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

The disclosure is not limited to standards and protocols if described. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. An image processing system that includes a neural network implemented on a computer for feature detection, comprising:
   a convolutional neural network having a plurality of layers stacked sequentially, including:
   a first set of layers, each layer of the first set of layers having a depth-wise convolution and a point-wise convolution, wherein the first set of layers is a first subset of a different neural network; and
   a second set of layers after the first set of layers that is based upon a compression of a remainder subset of layers of the different neural network, each layer of the second set of layers having a point-wise convolution.

2. The image processing system of claim 1, wherein:
   the convolutional neural network is configured to process an input image to detect target features within the input image; and
   the image processing system is configured to provide estimated feature locations for detected target features within the input image.

3. The image processing system of claim 2, wherein the image processing system further comprises a post-processor configured to receive tile data generated for the input image by the convolutional neural network and convert the tile data to one or more bounding boxes for the detected target features.

4. The image processing system of claim 3, wherein the target features are one or more of bodies, faces, eyes, or hands of a subject within the input image.

5. The image processing system of claim 3, wherein the image processing system further comprises a central processing unit (CPU) that executes processing of the convolutional neural network.

6. The image processing system of claim 5, wherein:
   the image processing system further comprises a neural processing unit (NPU); and
   the CPU executes the processing of the convolutional neural network without utilizing the NPU.

7. The image processing system of claim 2, wherein:
   the image processing system further comprises a pre-processor configured to process an original image and provide the processed original image to the convolutional neural network; and
   the pre-processor comprises a resize processor that resizes the original image and a color representation normalizer that normalizes colors for pixels within the original image.

8. The image processing system of claim 7, wherein the pre-processor further comprises a color scale converter that converts a color scale of the original image to a planar format.

9. The image processing system of claim 1, wherein the remainder subset comprises depth-wise convolutions and point-wise convolutions.

10. The image processing system of claim 9, wherein the compression of the remainder subset comprises omitting the depth-wise convolutions from the remainder subset to form the second set of layers.

11. The image processing system of claim 1, wherein the compression of the remainder subset reduces a computational cost of the different neural network.

12. The image processing system of claim 1, wherein the compression of the remainder subset reduces a number of parameters of the convolutional neural network relative to the different neural network.

13. The image processing system of claim 12, wherein the compression of the remainder subset is performed using a width multiplier that reduces the number of parameters of the remainder subset.

14. A method for feature detection, the method comprising:
   resizing an original image according to a convolutional neural network;
   changing color parameters of the resized image according to the convolutional neural network to generate an input image;
   processing the input image using the convolutional neural network to detect target features within the input image and generate tile data representing detected target features within the input image, the convolutional neural network comprising a first set of layers that is a first subset of a different neural network and a second set of layers stacked sequentially after the first set of layers and based upon a compression of a remainder subset of the different neural network; and
   processing the tile data to identify estimated feature locations of the detected target features.

15. The method of claim 14, wherein processing the input image using the convolutional neural network comprises:
   processing the input image using the first set of layers to generate first tile data;
   processing the first tile data using the second set of layers to generate second tile data; and
   processing the tile data to identify the estimated feature locations comprises processing the second tile data to generate bounding boxes for the detected target features.

16. The method of claim 15, wherein each layer of the first set of layers has a depth-wise convolution and a point-wise convolution.

17. The method of claim 16, wherein each layer of the second set of layers has a point-wise convolution and omits depth-wise convolutions of the remainder subset of the different neural network.

18. The method of claim 17, wherein processing the input image using the convolutional neural network comprises executing processing of the convolutional neural network on a central processing unit without utilizing a neural processing unit.

19. The method of claim 15, wherein the detected target features are one or more of bodies, faces, eyes, or hands of a subject within the input image.

20. The method of claim 14, wherein processing the input image using the convolutional neural network comprises executing processing of the convolutional neural network on a central processing unit.

* * * * *